July 30, 1963     J. R. TAYLOR     3,099,359
PARTS FEEDING DEVICE
Filed May 12, 1960
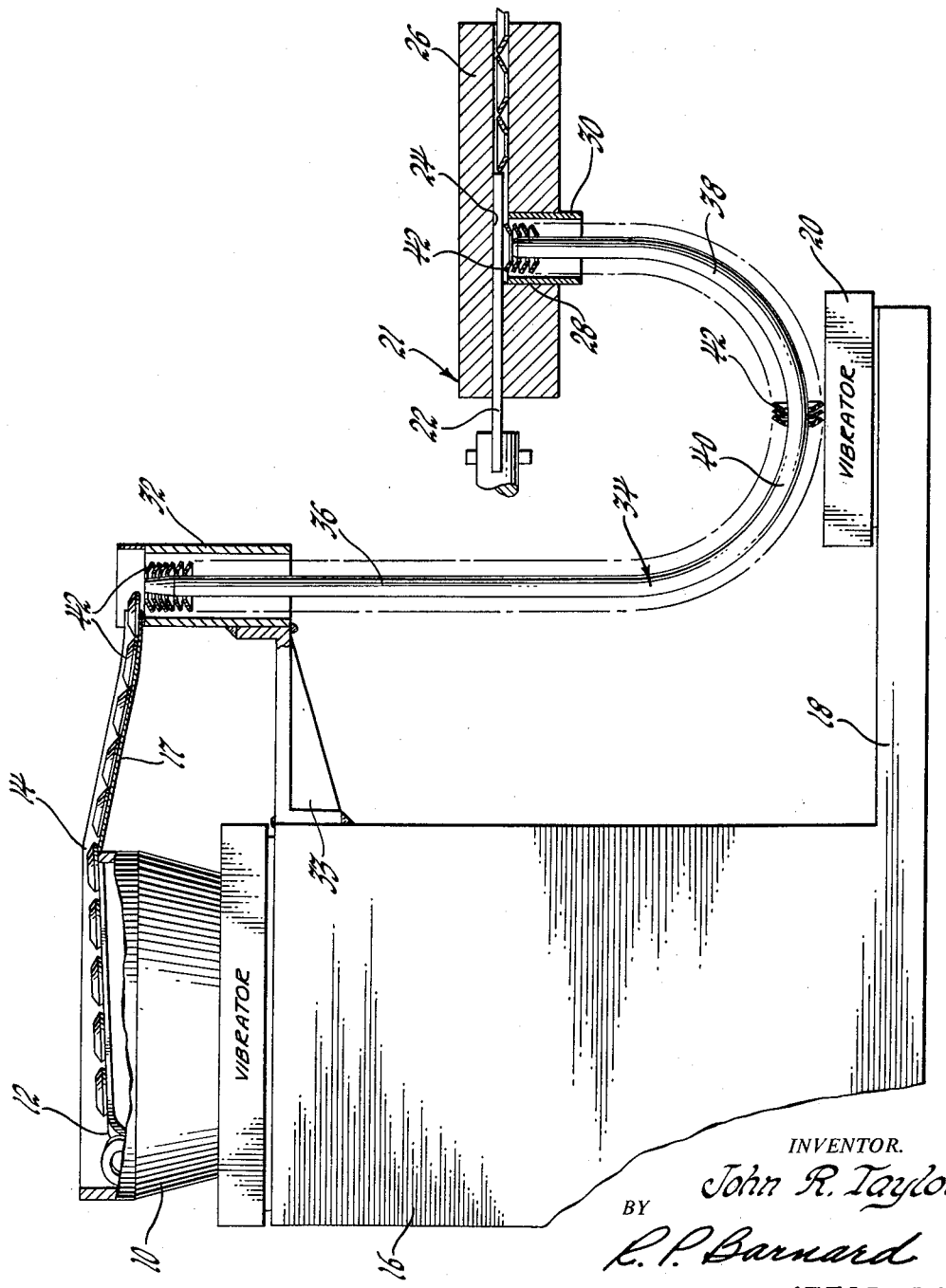
INVENTOR.
John R. Taylor
BY
R. P. Barnard
ATTORNEY

United States Patent Office 3,099,359
Patented July 30, 1963

---

3,099,359
PARTS FEEDING DEVICE
John R. Taylor, Lapeer, Mich., assignor to General Motors Corporation, Detroit, Mich., a corporation of Delaware
Filed May 12, 1960, Ser. No. 28,668
5 Claims. (Cl. 214—8)

This invention relates to apparatus for transferring parts from one station to another and, more particularly, to article feeding mechanism associated with a vibratory hopper.

In connection with the use of vibratory hoppers having a bowl with a spiral peripheral track and vibrating mechanism to drive individual parts from the bottom of the bowl along the track to an exit port, a wide variety of complicated part-transferring mechanisms have previously been provided to convey parts from the exit port to a remote station. These previous devices have included conveyor belts, mechanical push rods and the like. Such apparatus is often expensive, requiring frequent maintenance, and lacks sufficient operating speed to accommodate a high rate of delivery of articles from the hopper bowl.

One of the objects of this invention is to provide a simple and inexpensive transfer mechanism which requires no maintenance or repair. Another object of this invention is to provide part-transferring apparatus which is associated with a vibratory hopper and derives motivating power therefrom. Still another object is to provide apparatus capable of removing articles from a vibratory hopper at a rapid rate. In accordance with the foregoing and other objects disclosed in the following detailed description, the invention resides in the combination and arrangement of parts and in the details of construction hereinafter described and claimed, it being understood that changes in the precise embodiment herein disclosed may be made within the scope of the appended claims without departing from the spirit of the invention.

The preferred form of the invention has been shown in the accompanying drawing as comprising, a conventional vibratory hopper 10 having a peripheral feed track 12 extending upwardly from the bottom of the hopper in a spiral path for guiding articles in advancing movement therealong to a discharge port 14 and which is mounted on a vibratory table 16 in a conventional manner. A chute 17 may be provided to convey the articles away from the port 14. A portion 18 of the vibratory table 16 extends outwardly from beneath the hopper 10 and is provided with a vibrating plate 20 for a purpose to be hereinafter described. An assembly fixture 21 having a shuttle mechanism or the like is supported adjacent the vibratory hopper and comprises a power-actuated slide 22 that is reciprocable within a guideway 24 provided in a block member 26. A loading port 28 intersects the guideway 24 and a guide sleeve 30 may be provided therein to position articles within the guideway 24 in the path of the reciprocating slide 22. A similar guide sleeve 32 may be fixed to the vibratory hopper by a bracket 33 adjacent the end of the chute 17 or may be secured immediately adjacent the exit port 14 to guide articles as they are driven out of the vibratory hopper. A floating guide rod 34 is concentrically positioned in and extends between the guide sleeves 30, 32. The guide rod 34 is provided with a long, upwardly extending portion 36 and a short, upwardly extending portion 38 which are connected by a curved intermediate portion 40. In the illustrative embodiment, the articles being transferred are gasket members 42 which are centrally apertured for association with a spark plug member by the assembly fixture.

In operation, a quantity of the gasket members is deposited in the hopper in random fashion. As the hopper is actuated to cause a vibratory action, the gasket members 42 are driven upwardly from the bottom of the hopper in a predetermined condition along the spiral path to the discharge port 14 and into the guide sleeve 32 which positions the gasket members on the long portion 36 of guide rod 34 for downward movement therealong by the force of gravity until the curved portion 40, and eventually the short portion 38, are supporting closely spaced gasket members. The weight of the gasket members on the long portion of the guide rod 36 would be theoretically sufficient to drive the gaskets around the curved intermediate portion 40 and upwardly on the short portion of the guide rod 38 to discharge gaskets into the loading port 28 of the assembly fixture. However, because of friction and a tendency of the gasket members to jam on the curved intermediate portion 40, additional drive means are provided to insure a steady, uniform flow of gasket members from the discharge port 14 around the guide rod 34 to the loading port in the assembly fixture. Accordingly, the floating guide rod 34 is supported by the vibrating plate 20 through the gasket members 42 on the curved intermediate portion 40. The vibrating plate 20 tends to keep the gaskets from jamming on the guide rod and facilitates their movement thereon. The guide rod actually floats within the discharge port 14 and the loading port 28. The weight of the stack of gasket members 42 is sufficient to hold the guide rod in position and, as each gasket is removed from the loading port adjacent the short portion 38 by the shuttle slide 22 in the assembly mechanism, the weight of the longer stack of gasket members on the long portion 36 pushes the stack of gaskets around the curved intermediate portion 40 and upwardly on the short portion 38 toward the loading port 28. Although gasket members have been illustrated, many other parts are capable of being transported by the provision of a free-floating guideway that accommodates articles to be conveyed in prearranged condition and alignment by their own weight and vibrational force in the aforedescribed manner.

What is claimed is:

1. Conveyor mechanism in association with a vibratory hopper comprising a floating part-transferring rod, one end of said rod being positioned adjacent an exit port provided on said vibratory hopper, guide means associated with said one end of said rod to position articles discharged from said vibratory hopper on said rod, the other end of said rod being spaced outwardly from said one end of said rod and reversely bent and upwardly extended, an assembly fixture to further position said articles, guide means adjacent said other end of said rod and said assembly fixture to position said articles in prearranged position in said assembly means, and vibratory means operable in combination with said floating rod and located at the bent portion thereof to drive said articles from said vibratory hopper to said assembly means.

2. In association with a vibratory hopper having means to convey individual articles to an exit port in a predetermined condition, guide means adjacent said exit port, a floating member associated with said guide means and adapted to receive said individual articles, said floating member having a U-shape with a central curved portion connected by a pair of upwardly extending leg portions, apparatus for further positioning said individual articles and being spaced from said exit port, said floating member providing guide means between said exit port and said apparatus for said individual articles, and vibratory means located at the central curved portion of the floating member to drive said individual articles along said guide means provided from said exit port to said apparatus.

3. In association with a vibratory hopper having means to convey individual apertured articles from the hopper to an exit port in a predetermined condition: a vertical guide sleeve depending from said exit port, a floating guide rod, one end of said floating rod being positioned in said vertical guide sleeve and having a diameter allowing said apertured article to be slidably seated thereon, a curved portion of said floating guide rod being downwardly spaced from said one end, the other end of said floating rod extending upwardly from said curved portion, an assembly fixture for performing an assembly operation on said articles and being positioned adjacent said other end of said floating guide rod, guide means to position individual articles on said other end of said floating guide rod in position for said assembly operation in said assembly mechanism, said one end of said floating guide rod being vertically spaced above said other end of said floating guide rod so that the weight of individual articles on said one end of said floating guide rod tends to displace individual articles from the other end of said floating guide rod, and vibratory means to support said floating guide rod and drive said individual articles from said exit port to said assembly fixture on said floating guide rod.

4. Means for conveying individual articles from a position where they are separately supported to a work station, comprising: a U-shaped floating guide rod having a central curved portion and upwardly extending leg portions therefrom, one of said leg portions being longer than the other of said leg portions, means to position said individual articles on said one of said leg portions, said individual articles being slidably supported by said floating guide rod, vibratory means supporting said floating guide rod and being operative in combination with the effect of gravity to drive said individual articles from said one of said leg portions around said central curved portion and off the other of said leg portions, and article-receiving means provided at said work station to receive said individual articles as they are driven off the other of said leg portions.

5. In association with a vibratory hopper having means to convey individual articles from the hopper to an exit port in a predetermined condition: a guide sleeve depending from said exit port, a floating guide member, one end of said floating guide member being located in a position adjacent said guide sleeve and having means allowing said individual articles to be slidably associated therewith, said floating guide member having a curved portion being downwardly spaced from said one end, the other end of said floating guide member extending upwardly from said curved portion, conveyor means for removing said articles from said other end of said floating guide member, guide means to locate individual articles on said other end of said floating guide member in position for removal by said conveyor means, said one end of said floating guide member being vertically spaced above said other end of said floating guide member so that the weight of individual articles on said one end of said floating guide member tends to displace individual articles from the other end of said floating guide member, and vibratory means to support said floating guide member and drive said individual articles from said exit port to said assembly fixture on said floating guide member.

References Cited in the file of this patent

UNITED STATES PATENTS

| | | |
|---|---|---|
| 2,214,814 | Hambleton | Sept. 17, 1940 |
| 2,696,285 | Zenlea | Dec. 7, 1954 |
| 2,950,026 | Collazzo | Aug. 23, 1960 |

FOREIGN PATENTS

| | | |
|---|---|---|
| 916,277 | Germany | Aug. 5, 1954 |